US007079831B2

(12) United States Patent

Schwartzman et al.

(10) Patent No.: US 7,079,831 B2

(45) Date of Patent: Jul. 18, 2006

(54) METHOD AND APPARATUS FOR TWO-WAY COMMUNICATIONS AMONGST A PLURALITY OF COMMUNICATIONS DEVICES

(75) Inventors: Yaakov Schwartzman, Ganey Yehuda (IL); Doron Lavee, Karme Yosef (IL); Joel Kligman, Toronto (CA)

(73) Assignee: Strategic Vista International Inc., Markham (CA)

( * ) Notice: Subject to any disclaimer, the term of this patent is extended or adjusted under 35 U.S.C. 154(b) by 0 days.

(21) Appl. No.: 10/479,490

(22) PCT Filed: Jun. 3, 2002

(86) PCT No.: PCT/CA02/00829

§ 371 (c)(1), (2), (4) Date: Jun. 1, 2004

(87) PCT Pub. No.: WO02/099993

PCT Pub. Date: Dec. 12, 2002

(65) Prior Publication Data

US 2004/0239497 A1 Dec. 2, 2004

(30) Foreign Application Priority Data

Jun. 4, 2001 (CA) .................................... 2346656

(51) Int. Cl.
*H04M 11/04* (2006.01)

(52) U.S. Cl. .................... 455/404.1; 455/500; 340/3.2; 340/825.2; 375/132; 375/134; 375/362; 375/364

(58) Field of Classification Search ............ 455/404.1, 455/404.2, 67.11, 165.1, 500; 340/3.2, 539.16, 340/539.17, 539.1, 825.2; 375/130–134, 375/136, 137, 362–366, 368; 116/4, 6, 75
See application file for complete search history.

(56) References Cited

U.S. PATENT DOCUMENTS 4,442,527 A 4/1984 Munday (Continued)

FOREIGN PATENT DOCUMENTS

WO WO00/74257 A1 12/2000

(Continued)

*Primary Examiner*—William Trost
*Assistant Examiner*—James D Ewart
(74) *Attorney, Agent, or Firm*—Dimock Stratton LLP; Jenna L. Wilson

(57) ABSTRACT

In a security system, a method and apparatus for two-way frequency hopping communications between the control panel and each peripheral device which maintains channel synchronization through the assignment of fixed beacon frequencies for the transmission of synchronizing data. The use of frequency hopping provides high immunity to jamming and interference, reduced occurrence of multi-path phenomena, and allows for transmissions at a much higher output power than conventional fixed-frequency communications, to thus increase the effective range of the peripheral devices while providing effective and reliable two-way communications between the control panel and the peripheral devices. The invention also provides a large number of channels, which allows for actuators such as sirens, strobes and line seizing devices to be wireless in addition to sensors. The invention provides a high immunity to signal jamming, interference from other wireless systems and miss-detection due to multi-path phenomena; reduces opportunities for collision between peripheral transmissions; and eliminates the redundant emission of peripheral transmissions to reduce RF traffic in the vicinity of the system and extend the life of batteries used in the peripheral devices.

12 Claims, 3 Drawing Sheets

CT HS
CORDLESS TELEPHONE HANDSETS
CT HS
2-LINE CORDLESS TELEPHONE BASE STATION
RJ-31X BOX
SHARED TELEPHONE LINE (OPTION)
TO TELEPHONE LINES (ONE OR TWO LINES)
DEDICATED TELEPHONE LINE (OPTION)
CELLULAR PHONE
CELLULAR PHONE BACKUP (OPTION)
26
DIGITAL & VOICE COMMUNICATOR
900 MHz FREQUENCY HOPPING TRANSCEIVER
22
20
PROCESSORS, PROGRAM & DATA MEMORIES, KEYPAD & DISPLAY
CONTROL PANEL
24
40
900 MHz FREQUENCY HOPPING WIRELESS PERIPHERAL
900 MHZ FREQUENCY HOPPING 2-WAY WIRELESS COMMUNICATION BETWEEN CONTROL PANEL AND PERIPHERALS
PC CONNECTION
PERSONAL COMPUTER WITH SETUP AND PROGRAMMING SOFTWARE PACKAGE
2
40
900 MHz FREQUENCY HOPPING WIRELESS PERIPHERAL

U.S. PATENT DOCUMENTS 4,837,823 A 6/1989 Ham et al.
5,509,027 A 4/1996 Vook et al.
5,517,187 A * 5/1996 Bruwer et al. ............. 340/5.26
5,533,025 A * 7/1996 Fleek et al. ................. 370/445
5,737,318 A * 4/1998 Melnik ....................... 370/254
5,748,100 A * 5/1998 Gutman et al. ............ 340/7.22
5,809,013 A * 9/1998 Kackman .................... 370/253
5,963,650 A * 10/1999 Simionescu et al. .......... 705/63
6,144,693 A * 11/2000 Tabeta ........................ 375/132
6,188,715 B1 2/2001 Partyka
6,294,992 B1 * 9/2001 Addy et al. .............. 340/539.3
6,310,549 B1 * 10/2001 Loftin et al. ................ 340/547
6,690,276 B1 * 2/2004 Marino .................... 340/539.1
6,720,861 B1 * 4/2004 Rodenbeck et al. ....... 340/5.64
6,727,816 B1 * 4/2004 Helgeson .................... 340/540
6,728,293 B1 * 4/2004 Partyka ...................... 375/131
6,731,223 B1 * 5/2004 Partyka ................. 340/870.15
6,737,969 B1 * 5/2004 Carlson et al. ............. 340/547
6,831,557 B1 * 12/2004 Hess ..................... 340/539.16
6,859,831 B1 * 2/2005 Gelvin et al. ............... 709/224
6,870,875 B1 * 3/2005 Partyka ...................... 375/132
6,901,066 B1 * 5/2005 Helgeson .................... 370/348
2001/0001234 A1 * 5/2001 Addy et al. ................. 340/531
2001/0004375 A1 * 6/2001 Partyka ...................... 375/135

FOREIGN PATENT DOCUMENTS

WO WO00/75900 A1 12/2000

* cited by examiner

TOTAL HOPPING CYCLE TIME=0.05 sec.*225=11.25 seconds

SYNCHRONIZATION CYCLE TIME=0.05 sec.*226=11.5 seconds
GIVING SHIFT OF ONE HOPPING FREQUENCY FOR EVERY HOPPING CYCLE

METHOD AND APPARATUS FOR TWO-WAY COMMUNICATIONS AMONGST A PLURALITY OF COMMUNICATIONS DEVICES

FIELD OF THE INVENTION

This invention relates to two-way communications. In particular, this invention relates to a method and apparatus for two-way communications between a plurality of communications devices, particularly in a wireless security alarm system having a control panel and a plurality of peripheral devices.

BACKGROUND OF THE INVENTION

Security alarm systems are used in homes and in commercial and industrial facilities, for monitoring the premises to detect intruders, fire and environmental hazards such as carbon monoxide contamination. There are two types of security alarm systems: wired and wireless. Although both have been proven effective over many years, security alarm systems are still utilized in a minority of premises because of the cost and limitations of conventional wired systems.

Much of the cost of installing a wired alarm system is in the wiring, since the peripheral devices such as sensors and alarm condition indicators are dispersed throughout the premises and thus well remote from the base unit. In general it is advantageous to divide the premises into "zones" which are monitored independently, and although the sensors within a zone can be wired in series the zone circuits must be connected to the base unit in parallel in order for the base unit to be able to discriminate between zones.

A lot of wiring is required to adequately cover vulnerable entry points divided into a desirable number of zones, and a service technician installing such a system must thus spend considerable time fishing wires through walls in order to make the alarm system unobtrusive. This is a time consuming and costly procedure, and it is not always possible to conceal the wiring in structures such as condominiums and apartment buildings, older houses and houses with finished basements.

Wireless alarm systems are also known. In these systems a plurality of different kinds of wireless sensors distributed about the premises each emit a radio frequency (RF) signal with a characteristic frequency. The signal is transmitted when the sensor detects an intrusion, for example a point contact which is broken when a window is forced open or a motion detector which senses motion within its detection field. A receiver contained in a central unit monitors the various RF signals and signals a controller when one or more of the signals is transmitted, indicating an alarm condition. Such a system may provide many types of peripheral surveillance devices, including door and window sensors, motion detectors, "panic" transmitters and glass break detectors; peripheral environmental devices, including detectors for sensing smoke, combustion gas, carbon monoxide, moisture and temperature changes.

Wireless alarm systems are considerably easier to install, because peripheral sensors and actuators need only be mounted and do not have to be wired to the control panel. However, each wireless sensor and actuator requires a separate channel for communications to the control panel, in order to avoid "collision" between competing RF signals from different peripheral devices and to allow the control panel to recognize which peripheral sensor is emitting the signal. In a typical wireless system there are a limited number of RF channels available for peripheral sensors, and the cost of the system increases considerably as more channels are added.

Further, conventional systems provide only one-way communication, i.e. sensor-to-control panel signals, and thus alarm indication peripherals such as audible indicators and line seizing devices must still be wired to the base unit, which increases installation costs. In some cases the RF signals emitted by the peripheral sensors have a limited range before they become subject to interference and unreliability, which can limit the location of such peripherals and/or the control panel, or require expensive repeaters which receive the signal from a remote peripheral device and relay the signal to the control panel.

Also, the one-way communication of such systems precludes any verification procedure, which can result in false alarms caused by equipment malfunction and lead to costly and unnecessary response by emergency services personnel. This substantially reduces the reliability of the security system. Reliability is critical in a security system, and a wireless security system that cannot provide extremely high reliability is commercially unfeasible.

Patent Cooperation Treaty Application No. PCT/CA00/00662 filed Jun. 6, 2000 by the present applicant, which is incorporated herein by reference, describes a wireless security alarm system providing reliable two-way communication between a base unit and a plurality of peripheral devices, including both sensors and alarm indicators. This system provides a large number of channels for monitoring both intrusion and environmental conditions. The peripherals used in this system can be configured and reconfigured through the control panel, which has a digital communicator having full upload and download capabilities, permitting remote programming, alarm reception and verification and analysis of an alarm condition.

The use of wireless peripherals increases the possibility of intentional signal jamming and interference from other wireless systems, and miss-detection due to multi-path phenomena (where a transmitted signal is received both directly from the transmitting peripheral and indirectly through reflection off of the ground, the protected structure and other objects). These problems commensurately reduce the reliability of the security system. Where a large number of wireless peripheral devices are involved, opportunities for collision between peripheral transmissions is increased, further reducing the reliability of the security system.

Because of these potential problems, and because in a conventional wireless security system communication is one-way and the control panel cannot communicate with the peripheral sensors to acknowledge reception of a peripheral transmission, to obtain any reasonable level of reliability conventional wireless peripheral devices are designed to repeatedly signal the control panel in order to maximize the probability that the control panel receives the transmission. This redundant emission of RF signals further exacerbates the opportunities for collision mentioned above, and significantly reduces the operating life of the batteries used to power the peripheral devices.

SUMMARY OF THE INVENTION

The present invention provides a wireless security system having a large number of available channels for two-way communications between the control panel and each peripheral device, which has a high immunity to signal jamming, interference from other wireless systems and miss-detection due to multi-path phenomena; reduces opportunities for collision between peripheral transmissions; and eliminates the redundant emission of peripheral transmissions to thereby reduce RF traffic in the vicinity of the system and extend the life of batteries used in the peripheral devices. The security system of the invention is thus extremely reliable, yet can be manufactured at a cost comparable to conventional wireless security systems.

The invention accomplishes this by providing a method and apparatus for two-way frequency hopping communications between the control panel and each peripheral device, which maintains channel synchronization through the assignment of beacon frequencies for the transmission of synchronizing data. The use of frequency hopping provides high immunity to jamming and interference, reduced occurrence of multi-path phenomena, and allows for transmissions at a much higher output power than conventional fixed-frequency communications, to thus increase the effective range of the peripheral devices.

The method and apparatus of the invention thus provides effective and reliable two-way communications between the control panel and the peripheral devices. The method and apparatus of the invention also provides a large number of channels, which allows for actuators such as sirens, strobes and line seizing devices to be wireless. Further, the two-way communication allows each peripheral device to be configured as a repeater, so that remote peripheral devices can be located beyond the operating range of the control panel and one or more intervening peripheral devices within range of the control panel can be used to relay the signal from the remote peripheral device, thus significantly increasing the range of the security system without requiring the use of expensive repeater devices or sacrificing the reliability of the system.

The present invention thus provides a security system, comprising a control panel for communicating with a plurality of peripheral devices, and a plurality of peripheral devices, each comprising a transceiver for transmitting and receiving synchronization data packets on at least one fixed frequency, and transmitting and receiving operating data packets on a plurality of variable frequencies varied according to a frequency hopping sequence assigned by the control panel, the control panel comprising a transceiver for transmitting to and receiving from the peripheral devices synchronization data packets on a plurality of fixed frequencies, and transmitting to and receiving from the peripheral devices operating data packets on a plurality of variable frequencies varied according to the frequency hopping sequence, wherein when a peripheral device is unable to detect a synchronization signal from the control panel during a selected interval, the peripheral device transmits a signal to the control panel at a fixed frequency to notify the control panel that the peripheral device has lost synchronization with the frequency hopping sequence.

The present invention further provides a method of two-way communication in a security system between a control panel and a plurality of peripheral devices, comprising the steps of: a) the control panel assigning a frequency hopping sequence for the communication of operating data packets over a plurality of hopping frequencies, b) communicating all or part of the frequency hopping sequence to the peripheral devices on a fixed frequency, c) communicating operating data packets over the plurality of hopping frequencies according to the frequency hopping sequence, d) where any peripheral device loses synchronization with the frequency hopping sequence, A. detecting loss of synchronization with the frequency hopping sequence, B. communicating notification of the loss of synchronization to the control panel over a fixed frequency, and C. communicating synchronizing data packets to the peripheral device to reestablish synchronization with the frequency hopping sequence.

BRIEF DESCRIPTION OF THE DRAWINGS

In drawings which illustrate by way of example only a preferred embodiment of the invention.

DETAILED DESCRIPTION OF THE INVENTION

Figure 1:
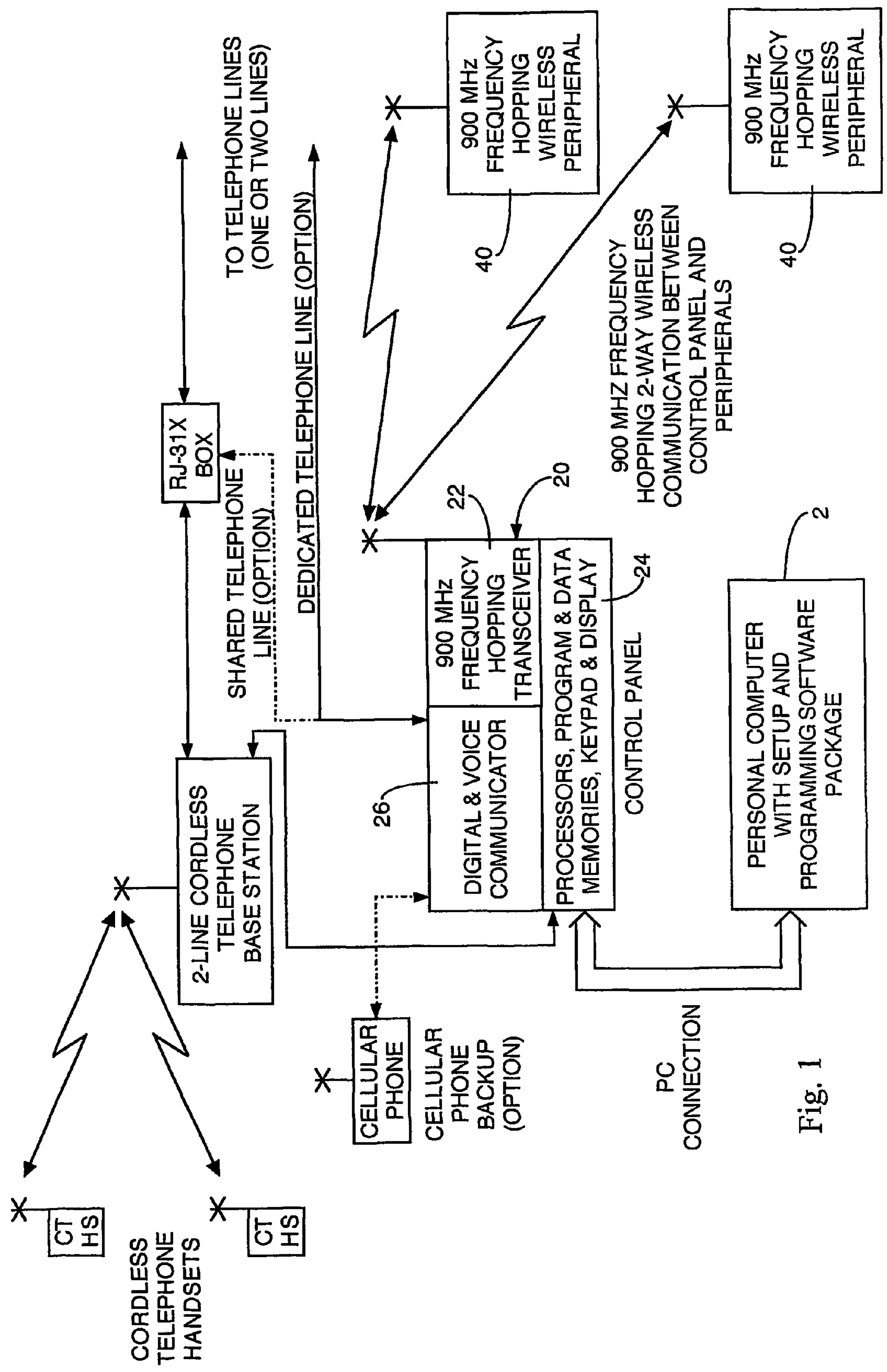
FIG. 1 is a schematic plan view of an embodiment of the alarm system of the invention.

FIG. 1 illustrates a preferred embodiment of a security system according to the invention. The components of the security system are described in Patent Cooperation Treaty Application No. PCT/CA00/00662 filed Jun. 6, 2000, which is incorporated herein by reference, except as hereinafter described.

Figure 4:
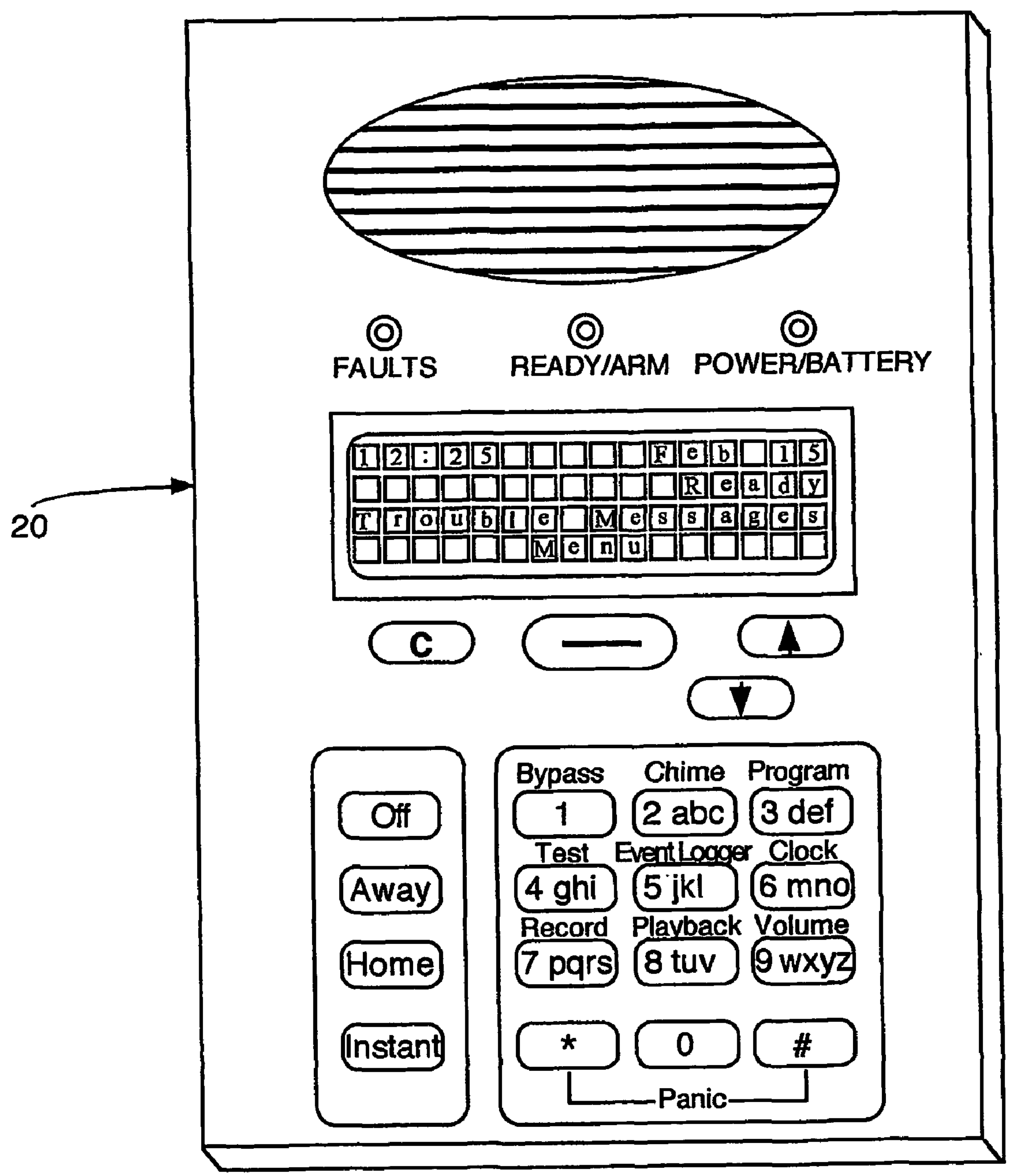
FIG. 4 is an elevational view of a control panel for the system of FIG. 1.

The system of the invention comprises a control panel 20, an embodiment of which is illustrated in FIG. 4, having a frequency hopping RF transceiver 22 preferably operating in the 900 MHz range; processing circuitry 24 with associated memory, data input and display as desired for the needs of the user of the security system; and optionally a communicator 26 for optional remote monitoring of the system and/or cellular telephone access to the system for monitoring and programming. The peripheral devices 40 may include sensors, such as point contacts for doors and windows, motion detectors, glass breakage sensors, vibration detectors, temperature and moisture sensors, smoke and hazardous gas detectors, etc.; and alarm indicators or "actuators" such as sirens, bells, strobe lights etc., each of which is equipped with a frequency hopping RF transceiver adapted to receive and transmit signals in the manner described below.

In the preferred embodiment the control panel 20 communicates with the peripheral devices 40 via frequency hopping digital spread spectrum RF communications in the ISM band (902 MHz to 928 MHz), which is stable over a large distance and resistant to outside interference and ambient noise, using any suitable modulation technique, for example frequency shift keying (FSK).

The communications are preferably effected using Manchester Code at an asynchronous data rate of 9600 baud (19,200 baud bit rate), which allows digital data to be communicated in packets having a header address unique to specific peripheral devices 40, so that each peripheral device 40 processes only packets having its unique address and the control panel 20 recognizes the transmitting peripheral device 40 when incoming transmissions are received. The receiving device (control panel 20 or peripheral device 40) should respond to received transmissions with an acknowledgement packet, reducing redundant or repeated transmissions to those cases where an acknowledgement packet is not received after a transmission.

In the preferred embodiment, at 9600 baud each data packet has a transmission time of 27.5 msec, comprising 10 msec for preamble synchronization, 12.5 msec for data transmission (12 ASCII bytes of 10 bits per byte, Manchester coded data) and a 5 msec end margin time (PLL and send/receive settling time). Each data packet also includes high level error detection code.

Figure 2:
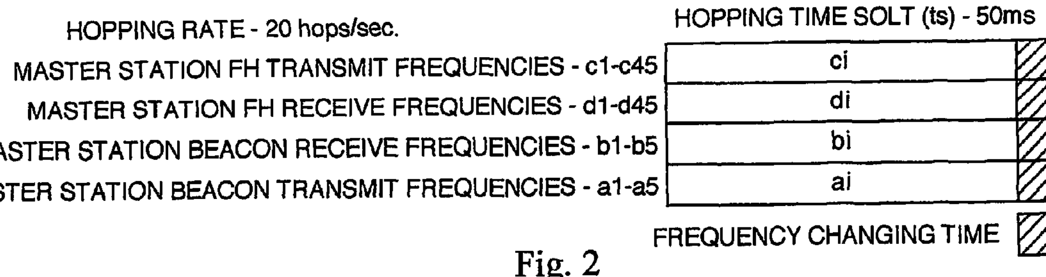
FIG. 2 is a schematic diagram of a frequency division for the system of FIG. 1.

According to the invention, the ISM band is divided into a plurality of channels, in the preferred embodiment 100 channels each having a bandwidth of 30 kHz, with a spacing of at least 150 kHz between channels. Of these channels, 50 channels are dedicated to outgoing transmissions (control panel to peripheral devices) and the other 50 channels are dedicated to incoming transmissions (peripheral devices to control panel). To avoid transmission collision and receiver desensitization due to random or non-supervised peripherals, the ISM band can be divided into two groups of frequencies, as shown in FIG. 2, preferably with a guard band of at least 2 MHz between groups.

In the preferred embodiment, within each channel group five channels are dedicated as fixed frequency "beacon" channels, and the remaining 45 channels are used for frequency hopping. The upper half of the ISM band can be used for transmissions in one direction, for example outgoing as shown in FIG. 2, comprising outgoing frequency hopping frequencies 1 to 45 and outgoing beacon frequencies 1 to 5. The lower half of the ISM band can be used for transmissions in the other direction, shown in FIG. 2 as incoming, comprising incoming frequency hopping frequencies 1 to 45 and incoming beacon frequencies 1 to 5.

Figure 3:
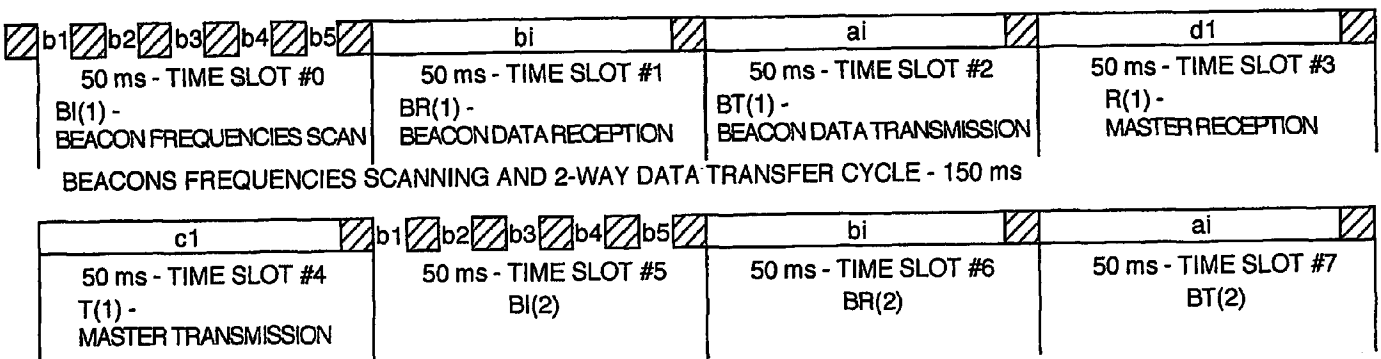
FIG. 3 is a schematic diagram of a preferred frequency hopping protocol for the system of FIG. 1.
Figure 3:
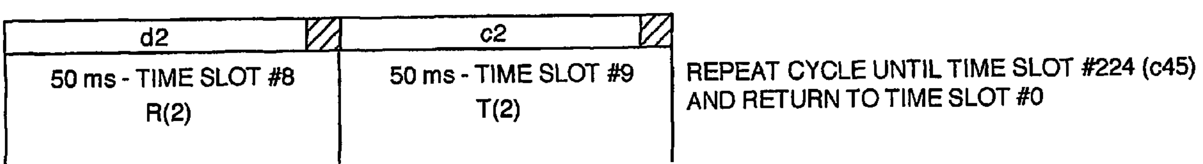

A control panel monitoring cycle is defined, as shown in FIG. 3, during which the control panel 20 monitors incoming signals from the peripheral devices 40 and detects a loss of frequency hopping synchronization in any of the peripheral devices 40.

The frequency hopping sequence is established by the processor in the control panel 20 according to an algorithm programmed into the control panel's processor, which preferably assigns frequencies for a control panel monitoring cycle in a pseudo-random fashion. The control panel 20 varies the frequency hopping frequencies in a control panel monitoring cycle according to a predetermined algorithm, and during each control panel monitoring cycle transmits synchronization data (i.e. timing and frequency allocation) for the next successive control panel monitoring cycle.

A preferred example of the control panel monitoring cycle is illustrated in FIG. 3. The monitoring cycle comprises five 50 msec time slots, as follows:

1) assigned to scanning of incoming beacon channels (Time Slot 0 in FIG. 3);
2) assigned to reception of incoming beacon signals (e.g. drop out notification data) on beacon channels (Time Slot 1 in FIG. 3);
3) assigned to transmission of outgoing beacon signals (e.g. synchronization data for reestablishing synchronization a dropped out peripheral device) on outgoing beacon channels (Time Slot 2 in FIG. 3);
4) assigned to operating data reception, including control panel reception of incoming transmissions and peripheral device acknowledgement of reception of outgoing transmissions (Time Slot 3 in FIG. 3); and
5) assigned to operating data transmission, including control panel acknowledgement of reception of incoming transmissions and transmission of time synchronization data to the peripheral devices 40, or during any portion of this time slot in which no transmission is required, scanning of incoming beacon channels (Time Slot 4 in FIG. 3).

Thus, as shown in FIG. 3, the first 150 msec of each control panel monitoring cycle involves beacon frequency scanning and two-way data transfer to detect any peripheral device 40 which has lost synchronization, or "dropped out" of the control panel frequency hopping sequence, and reestablish synchronization with each peripheral device 40 that has dropped out. The next 50 msec is dedicated to receiving incoming signals, for example alarm data, peripheral status data etc., and the last 50 msec is dedicated to transmitting outgoing signals, for example configuration data, request for acknowledgement of signal reception, synchronization data for the next control panel monitoring cycle, etc.

The operation of the invention is as follows: Upon power-up, the control panel 20 assigns a hopping frequency sequence for the first 45 control panel monitoring cycles, pseudo-randomly or otherwise according to the programmed algorithm in the control panel processor, and transmits synchronization data (timing and frequency allocation) for the first control panel monitoring cycle to the peripheral devices 40 on one or more of the outgoing beacon channels.

During normal operation, the control panel 20 transmits and receives operating data (for example alarm indications, acknowledgements, status etc.) to and from the peripheral devices 40 during the operating data receive and transmit intervals, respectively (Time Slots 3 and 4 in FIG. 3). During the operating data transmit interval (Time Slot 4 in FIG. 3) the control panel 20 also transmits synchronization data (timing and frequency allocation) for the next successive control panel monitoring cycle to the peripheral devices 40. This process continues through successive control panel monitoring cycles. It will be appreciated that for clarity only two control panel monitoring cycles are shown in FIG. 3, Time Slot 0 corresponding with Time Slot 5, Time Slot 1 corresponding with Time Slot 6, etc.; whereas in operation the control panel monitoring cycle repeats for each of the 45 hopping frequencies, so that a complete transmission/reception cycle takes 11.25 seconds (250 msec per control panel monitoring cycle times 45 frequencies).

When a peripheral device 40 drops out of the frequency hopping sequence, it is unable to transmit to the control panel 20 on a hopping frequency and instead transmits a drop out notification signal to the control panel 20 on one of the fixed beacon frequencies. During each scanning time slot (0, 1 and 2, and also portions of 4 if no transmission of data is required), the control panel 20 scans all five incoming beacon channels (at 10 msec per channel) and determines whether any transmission from a dropped out (unsynchronized) peripheral device 40 is present. If a drop out notification transmission on an incoming beacon channel is detected, the control panel 20 recognizes which peripheral device 40 has dropped out from the unique packet header address and commences a peripheral device synchronization procedure whereby during the next control panel monitoring cycle, the control panel 20 transmits a synchronization signal during the beacon transmitting time slots (Time Slot 2 in FIG. 3), on the outgoing beacon channel which matches the incoming beacon channel on which the drop out notification was detected. This synchronization signal resynchronizes the dropped out peripheral device 40, which upon reaching the next control panel operating data reception interval (for example, Time Slot 3 or 8 in FIG. 3) transmits acknowledgement data to the control panel 20 to verify that synchronization of the peripheral device 40 has been reestablished. The resynchronized peripheral device 40 similarly receives an acknowledgment signal from the control panel 20 in the following control panel transmission time slot (for example, time slot 4 in FIG. 3), verifying reception of the signal from the resynchronized peripheral device 40.

Synchronized peripheral devices 40 will listen once per minute for the control panel synchronization signal. If the signal is received, synchronization is confirmed. Any peripheral device 40 that does not receive the synchronization signal will try to receive again one minute later, and again one minute later. After the third unsuccessful attempt, the peripheral device 40 will recognize that it has lost synchronization with the frequency hopping sequence, and will address the control panel 20 on an incoming beacon channel according to the procedure described above for unsynchronized peripheral devices 40.

The use of a plurality of beacon frequencies accommodates the possibility that more than one peripheral device 40 will drop out of the frequency hopping sequence, and thus provides a mechanism for the control panel 20 to detect the loss of synchronization of up to five peripheral devices during any particular control panel monitoring cycle. If an event takes place which causes all or a large number of the peripheral devices 40 to lose synchronization, the control panel 20 will first transmit on an outgoing beacon frequency a command which prevents all the affected peripheral devices 40 from transmitting. The control panel 20 will then signal each of the dropped out peripheral devices 40 in turn, on the outgoing beacon frequency, according to a priority set for each peripheral device 40 at the time of installation, and transmit a synchronization signal to the respective peripheral device 40 on the outgoing beacon frequency. The control panel 20 repeats this process until all of the affected peripheral devices 40 have been resynchronized.

The operation of the system of the present invention may otherwise be in accordance with the system described in Patent Cooperation Treaty Application No. PCT/CA00/00662. For example, the control panel 20 and peripherals 40 can be configured and initialized by a personal computer 2 having appropriate software, and the peripheral devices 40 can be reconfigured, added and removed from the system as needed. The control panel 20 can be programmed to associate specified groups of peripherals 40 as separate zones, for ease of activating/deactivating portions of the system. These groups can be reconfigured on site or remotely, as desired, and troublesome zones can be repaired or isolated from the system.

A preferred embodiment of the invention having been thus described by way of example, it will be appreciated by those skilled in the art that certain adaptations and modifications may be made without departing from the scope of the invention. The invention includes all such variations and modifications as fall within the scope of the claims.

We claim:

1. A security system, comprising a control panel for communicating with a plurality of peripheral devices, and a plurality of peripheral devices, each comprising a transceiver for transmitting and receiving synchronization data packets on at least one fixed frequency, and transmitting and receiving operating data packets on a plurality of variable frequencies varied according to a frequency hopping sequence assigned by the control panel, the control panel comprising a transceiver for transmitting to and receiving from the peripheral devices synchronization data packets on a plurality of fixed frequencies, and transmitting to and receiving from the peripheral devices operating data packets on a plurality of variable frequencies varied according to the frequency hopping sequence, wherein when a peripheral device is unable to detect a synchronization signal from the control panel during a selected interval, the peripheral device transmits a signal to the control panel at a fixed frequency to notify the control panel that the peripheral device has lost synchronization with the frequency hopping sequence.

2. The security system of claim 1 wherein the plurality of variable outgoing frequencies and the plurality of fixed outgoing frequencies comprise a first group of frequencies in a transmission frequency band, and the plurality of variable incoming frequencies and the at least one fixed incoming frequency comprise a second group of frequencies in the transmission frequency band, such that the first and second groups of frequencies are divided by sufficient bandwidth to avoid transmission collision and receiver desensitization.

3. The security system of claim 2 wherein each transceiver of the plurality of peripheral devices and the control panel transceiver operate in the 900 MHz range.

4. The security system of claim 1 wherein when the control panel receives the signal at a fixed frequency notifying the control panel that the peripheral device has lost synchronization with the frequency hopping sequence, the control panel transmits a synchronization signal at the same fixed frequency for receipt by the peripheral device that has lost synchronization.

5. The security system of claim 1 wherein the synchronization data packets and the operating data packets comprise a header address unique to one of the plurality of peripheral devices.

6. The security system of claim 1 wherein the plurality of peripheral devices comprises at least one perimeter monitor.

7. The security system of claim 1 wherein the plurality of peripheral devices comprises at least one transceiver for monitoring the status of an article located within the range of the control panel transceiver.

8. The security system of claim 1 wherein the peripheral devices transmit on a first set of fixed frequencies, the control panel transmits on a second different set of fixed frequencies, the peripheral devices transmit on a first set of variable frequencies and the control panel transmits on a second different set of variable frequencies.

9. A method of two-way communication in a security system between a control panel and a plurality of peripheral devices, comprising the steps of:

a) the control panel assigning a frequency hopping sequence for the communication of operating data packets over a plurality of hopping frequencies, b) communicating all or part of the frequency hopping sequence to the peripheral devices on a fixed frequency, c) communicating operating data over the plurality of hopping frequencies according to the frequency hopping sequence, d) where any peripheral device loses synchronization with the frequency hopping sequence, A. detecting loss of synchronization with the frequency hopping sequence, B. communicating notification of the loss of synchronization to the control panel over a fixed frequency, and C. communicating synchronizing data packets to the peripheral device to reestablish synchronization with the frequency hopping sequence.

10. The method of claim 9, further comprising the steps of, where any peripheral device loses synchronization with die frequency hopping sequence, D. communicating verification data to the control panel to verify that the synchronization has been reestablished, and B. communicating acknowledgement to the peripheral device that the verification data has been received.

11. A method for synchronizing two-way communication between a control panel and a plurality of peripheral devices in a security system, the method comprising the steps of:

a) assigning a frequency hopping sequence for the communication of operating data packets over a plurality of hopping frequencies, b) communicating all or part of the frequency hopping sequence to the peripheral devices on a fixed frequency, c) upon a detection of loss of synchronization of any peripheral device with the frequency hopping sequence, A. communicating notification of the loss of synchronization to the control panel over a fixed frequency, and B. communicating synchronizing data packets over the fixed frequency to the peripheral device to reestablish synchronization with the frequency hopping sequence.

12. The method of claim 11 further comprising the steps of assigning a further frequency hopping sequence for the communication of operating data packets over a plurality of hopping frequencies and communicating all or part of the further frequency hopping sequence to the peripheral devices on a hopping frequency in accordance with the frequency hopping sequence.

* * * * *